US012697600B2

(12) United States Patent     (10) Patent No.:   US 12,697,600 B2

Shirsat et al.     (45) Date of Patent:     Aug. 4, 2026

---

(54) POLYMERIC MATERIAL COMPOSITION

(71) Applicant: UPL LIMITED, Mumbai (IN)

(72) Inventors: Rajan Ramakant Shirsat, Mumbai (IN); Pradip Dattatray Wagh, Mumbai (IN)

(73) Assignee: UPL Limited, Mumbai (IN)

( * ) Notice: Subject to any disclaimer, the term of this patent is extended or adjusted under 35 U.S.C. 154(b) by 69 days.

(21) Appl. No.: 18/559,935

(22) PCT Filed: May 10, 2022

(86) PCT No.: PCT/IN2022/050457
§ 371 (c)(1),
(2) Date: Nov. 9, 2023

(87) PCT Pub. No.: WO2022/239029
PCT Pub. Date: Nov. 17, 2022

(65) Prior Publication Data
US 2024/0238758 A1     Jul. 18, 2024

(30) Foreign Application Priority Data
May 10, 2021    (IN) .............................. 202121021117

(51) Int. Cl.
B01J 20/24       (2006.01)
B01J 20/10       (2006.01)
(Continued)

(52) U.S. Cl.
CPC ............. B01J 20/24 (2013.01); B01J 20/103 (2013.01); B01J 20/28004 (2013.01);
(Continued)

(58) Field of Classification Search
None
See application file for complete search history.

(56) References Cited

U.S. PATENT DOCUMENTS

| | | | |
|---|---|---|---|
| 4,286,082 A | 8/1981 | Tsubakimoto et al. | |
| 4,381,782 A | 5/1983 | Mazurak et al. | |
| (Continued) | | | |

FOREIGN PATENT DOCUMENTS

| | | |
|---|---|---|
| CN | 107586190 A | 1/2018 |
| CN | 107641274 A | 1/2018 |
| (Continued) | | |

OTHER PUBLICATIONS

International Search Report and Written Opinion for International Application No. PCT/IN2022/050457, International Search Authority, Australian Patent Office, mailed on Jul. 29, 2022, 10 pages.

*Primary Examiner* — Ronak C Patel

(74) *Attorney, Agent, or Firm* — Sterne, Kessler, Goldstein & Fox P.L.L.C.

(57) ABSTRACT

The present invention provides a polymeric material composition comprising: (a) at least one superabsorbent polymer; and (b) 0.1% w/w to 2% w/w microporous silicon dioxide; wherein polymeric material composition exhibits non-hygroscopic characteristics with moisture content less than 15% w/w of the total weight of the polymeric material composition at room temperature. The present invention further provides process of preparing said polymeric composition and method of its application.

9 Claims, 1 Drawing Sheet

(51) Int. Cl.

| | |
|---|---|
| *B01J 20/28* | (2006.01) |
| *C09K 17/02* | (2006.01) |
| *C09K 17/32* | (2006.01) |
| *C09K 17/40* | (2006.01) |
| *C09K 101/00* | (2006.01) |

(52) U.S. Cl.
CPC ..... *B01J 20/28016* (2013.01); *B01J 20/2803* (2013.01); *C09K 17/02* (2013.01); *C09K 17/32* (2013.01); *C09K 17/40* (2013.01); *C09K 2101/00* (2013.01)

(56) References Cited

U.S. PATENT DOCUMENTS

| | | | | |
|---|---|---|---|---|
| 4,587,308 | A | 5/1986 | Makita et al. | |
| 10,046,305 | B2 | 8/2018 | Kim et al. | |
| 10,927,223 | B2 | 2/2021 | Nam et al. | |
| 2012/0277099 | A1* | 11/2012 | Olson | C09D 5/14 |
| | | | | 47/57.6 |
| 2016/0271584 | A1* | 9/2016 | Lee | C08F 20/06 |
| 2018/0244867 | A1* | 8/2018 | Kim | C08K 7/22 |

FOREIGN PATENT DOCUMENTS

| | | | |
|---|---|---|---|
| EP | 2942067 | A1 | 11/2015 |
| EP | 3031857 | B1 | 10/2018 |
| WO | WO-2000010619 | A1 | 3/2000 |
| WO | WO-2016162783 | A1 | 10/2016 |
| WO | WO-2022239029 | A1 | 11/2022 |

* cited by examiner

POLYMERIC MATERIAL COMPOSITION

CROSS-REFERENCE TO RELATED APPLICATIONS

This application is the U.S. National Stage of International Patent Application No. PCT/IN2022/050457, filed May 10, 2022, which claims the benefit of IN Application No. 202121021117, filed May 10, 2021, the disclosures of which are herein incorporated by reference in their entireties.

Field of the Invention: The present invention relates to a polymeric material composition. The present invention more particularly relates to a polymeric material composition comprising of superabsorbent polymers, especially starch-based superabsorbent polymers capable of retaining its flowability characteristics through controlled moisture content.

BACKGROUND OF THE INVENTION

Superabsorbent polymers (SAPs) are materials that can absorb significant amounts of water relative to their mass. The nature and properties of SAPs make them a widely utilized material across many disciplines. SAPs are vastly used in agricultural or horticultural applications. Applying SAPs to soil in agricultural settings have resulted in earlier seed germination and/or blooming, decreased irrigation requirements, increased propagation, increased crop growth and production, increased crop quality, decreased soil crusting, increased yield and decreased time of emergence.

Synthetic SAPs are commercially available and are conventionally used in agricultural applications. However, problem of degradation of SAP into soil is a major concern and thus synthetic SAPs are not much appreciated.

Another type of SAP product used more widely in agricultural applications includes starch graft copolymers. Starch graft copolymers comprise a monomer graft polymerized onto a polysaccharide, such as a starch or cellulose. Starch graft copolymers are biodegradable and are typically used to absorb aqueous fluids, increases the water holding capacity of soils, and as coatings onto seeds, fibers, clays, and the like. Due to biodegradable nature, starch-based SAPs are preferred choice of growers.

However, apart from diversified applications of starch-based SAP especially in agriculture sector, one has to tackle several challenges associated due to its characteristics. Firstly, starch-based SAP tends to absorb moisture from the air and, when exposed to a humid environment, to agglomerate together into large chunks, i.e. to form a cake. This leads to clumping and caking, and SAPs lose their free-flowing property.

If the SAP particles are not free flowing, problems arise. For example, the particles are difficult to incorporate into the absorbent article because the reduction in fluidity interferes with the homogeneous distribution of the particles in the absorbent core. In addition, the particles tend to stick to each other and to manufacturing equipment such as screens, dryers and processors. Therefore, the production should be stopped periodically to remove the aggregated particles so that the device can be cleaned. Finally, if the particles have already absorbed and agglomerated some water, the water swelling capacity of the absorbent article, the final article, is reduced.

Attempts have been made to control moisture in SAPs and to retain its free-flowing characteristics. EP3031857 B1 discloses a superabsorbent polymer composition comprising a superabsorbent polymer and aluminium hydroxide, wherein the aluminium hydroxide is attached on the surface of the superabsorbent polymer through chemical treatment by effecting the mixture of SAP and aluminium hydroxide by diol or glycol-based surface treatment solution such as propanediol or ethylene glycol diglycidyl ether. Furthermore, it indicates an improved anti-caking effect but excessive reduction in absorbency under pressure (AUP) by addition of a small amount of silica. Drawback of this prior art is that it involves cumbersome process of surface treatment using chemicals. Neither it specifies treatment of starch-based SAPs and the improvement of anti-caking behaviour nor its application and performance in the agriculture sector.

WO2000010619 provides a particulate material composition comprising an inorganic powder intermixed with particles of superabsorbent polymer. The polymer particles are of such size that less than about 60% of said polymer particles, by weight, will pass through a U.S. Standard 50 mesh sieve with 300 micrometer openings. The resultant particulate material composition exhibits excellent anti-caking characteristics. Inorganic powder includes clays (i.e., hydrated aluminium silicates, generally of the formula $H_2Al_2Si_2O_8 \cdot H_2O$). Suitable clays are kaolin clays. The particulate material undergoes surface modification with surface linking agent (such as ethylene carbonate) prior to its interaction with clay (inorganic powder). It further discloses marked reduction of anti-caking property when silica is used in place of kaolin wherein just 70% of the composition pass through U.S. Standard 50 mesh sieve instead of 90% in case of kaolin. Furthermore, it does not disclose surface treatment of starch-based SAPs.

Surfactants also have been used in attempts to reduce the tendency of superabsorbent polymer particles to agglomerate, as shown for instance, in U.S. Pat. Nos. 4,286,082, and 4,381,782. However, surfactants can also reduce the surface tension of the superabsorbent polymer, which, in turn, interferes with the ability of the polymer to absorb and to hold liquid. A need still exists for SAP compositions, especially starch-based SAP compositions with good anti-caking properties. To overcome caking and hygroscopicity in starch-based SAP is more challenging as starch-based SAPs are not only prone to absorb moisture from surroundings but it also has inherent moisture due to starch component which again is a polymeric material.

Objectives of the Invention

An objective of the present invention is to provide a particulate material composition comprising SAPs with controlled moisture content.

Another objective of the present invention is to provide a particulate material composition comprising starch-based SAPs with controlled moisture content.

Another objective of the present invention is to provide a particulate material composition of starch-based SAPs which remains non-hygroscopic when exposed to surrounding moisture.

Further objective of the present invention is to provide a particulate material composition of starch-based SAPs with reduced caking and capable of retaining flowability.

Still another objective of the present invention is to provide a process for the preparation of particulate material composition comprising starch-based SAPs.

Yet another objective of the present invention is to provide method of treatment of plants and plant propagation material with particulate material composition.

SUMMARY OF THE INVENTION

In an aspect of the present invention, there is provided a polymeric material composition comprising:

(a) at least one superabsorbent polymer; and (b) 0.1% w/w to 2% w/w microporous silicon dioxide; wherein polymeric material composition exhibits non-hygroscopic characteristics with moisture content less than 15% w/w of the total weight of the composition at room temperature.

In another aspect of the present invention, there is provided a polymeric material composition comprising:

(a) at least one superabsorbent polymer, and (b) 0.1% w/w to 2% w/w microporous silicon dioxide; wherein said composition has a moisture content lesser than 15% w/w of the total weight of the composition at room temperature.

In another aspect of the present invention, there is provided a polymeric material composition comprising:

(a) at least one superabsorbent polymer; and (b) 0.1% w/w to 2% w/w microporous silicon dioxide; wherein polymeric material composition exhibits non-hygroscopic characteristics with moisture content less than 15% w/w of the total weight of the composition at room temperature and in humidity ranging from 80-90%.

In another aspect of the present invention, there is provided a polymeric material composition comprising:

(a) at least one superabsorbent polymer; and (b) 0.1% w/w to 2% w/w microporous silicon dioxide; wherein said composition has a moisture content lesser than 15% w/w of the total weight of the composition at room temperature.

In another aspect of the present invention, there is provided a polymeric material composition comprising:

(a) at least one starch-grafted superabsorbent polymer; and (b) 0.1% w/w to 2% w/w microporous silicon dioxide; wherein polymeric material composition exhibits non-hygroscopic characteristics with moisture content less than 15% w/w of the total weight of the composition at room temperature and in humidity ranging from 80-90%.

In another aspect of the present invention, there is provided a polymeric material composition comprising:

(a) at least one starch-grafted superabsorbent polymer; and (b) 0.1% w/w to 2% w/w microporous silicon dioxide; wherein said composition has a moisture content lesser than 15% w/w of the total weight of the composition at room temperature.

In another aspect, a process of preparing a polymeric material composition comprising at least one superabsorbent polymer and 0.1% w/w to 2% w/w microporous silicon dioxide; wherein polymeric material composition exhibits non-hygroscopic characteristics with moisture content less than 15% w/w of the total weight of the composition at room temperature and in humidity ranging from 80-90%; and wherein the process comprises the steps of:

1. contacting superabsorbent polymer and microporous silicon dioxide in a mixing vessel; and 2. blending the contents of step (1) to obtain the polymeric material composition.

In another aspect of the present invention, a process of preparing polymeric material composition comprising at least one superabsorbent polymer and 0.1% w/w to 2% w/w microporous silicon dioxide; wherein polymeric material composition has a moisture content less than 15% w/w of the total weight of the composition at room temperature and in humidity ranging from 80-90%; and wherein process comprises steps of:

1. contacting the superabsorbent polymer and microporous silicon dioxide in a mixing vessel;

2. blending the contents of step (1) to obtain polymeric material composition.

In yet another aspect of the present invention, a method of treating soil, plants and plant propagation material by applying to their locus, a polymeric material composition comprising: at least one superabsorbent polymer and 0.1% w/w to 2% w/w microporous silicon dioxide wherein polymeric material composition exhibits non-hygroscopic characteristics with moisture content less than 15% w/w of the total weight of the composition at room temperature and in humidity ranging from 80-90%.

In another aspect of the present invention, a method of treating soil, plants and plant propagation material by applying to their locus, a polymeric material composition comprising: at least one superabsorbent polymer; and 0.1% w/w to 2% w/w microporous silicon dioxide wherein said polymeric material composition exhibits non-hygroscopic characteristics with moisture content lesser than 15% w/w of the total weight of said composition at room temperature and in humidity ranging from 80-90%.

In another aspect of the present invention, the polymeric material composition is used in soil application for water retention.

DETAILED DESCRIPTION OF THE INVENTION

Figure 1:
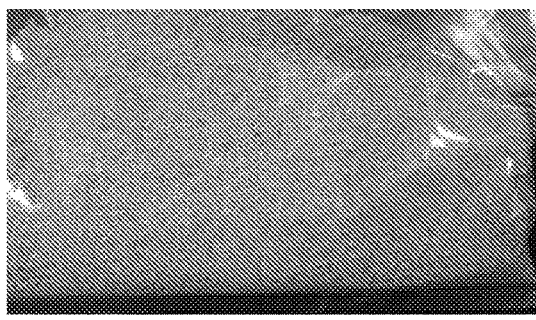
FIG. 1 is a photograph of a composition comprising 0.6% microporous silica and starch based superabsorbent polymer of 8 to 60 mesh size.

Surprisingly, inventors of the present invention found that a polymeric material composition of starch-grafted SAPs with enhanced non-hygroscopic characteristics can be obtained by combining 0.1% w/w to 2% microporous silicon dioxide with starch grafted superabsorbent polymers. Addition of microporous silicon dioxide below 2% exhibited marked improvement in caking tendency of starch grafted SAPs by effectively controlling inherent moisture of superabsorbent polymer as well as by providing suitable barrier from surrounding moisture. The polymeric material composition developed according to the present invention do not agglomerate when exposed to a humid environment, i.e., it comprises preferably about 90% or more free-flowing particles and moisture content lesser than 15% at room temperature and in humidity ranging from 80-90%.

Advantages of the Present Invention

The polymeric composition can be stored and shipped, even in hot, humid locations with little or no caking problems.

The polymeric composition retains the regular particle size distribution.

The polymeric composition offers dust reduction and remain intact while shipping and storage.

Some of the objects and advantages of the invention having been stated, other objects and advantages will become evident as the description proceeds.

Within the context of this specification, the terms "superabsorbent polymer" or "SAP" or "polymer gel" refer to water swellable polymers that can absorb water many times their weight in an aqueous solution. Without wishing to be bound by theory, the term superabsorbent polymers also apply to polymers that absorb water as well as de-sorb the absorbed water.

The superabsorbent polymer may be selected from but not limited to water-swellable or water absorbing or water-retentive polymers such as cross-linked polymers that swell without dissolving in the presence of water, and may, absorb at least 10, 100, 1000, or more times their weight in water.

Accordingly, in an embodiment of the present invention, provided is a polymeric material composition comprising:

(a) at least one superabsorbent polymer; and (b) 0.1% w/w to 2% w/w microporous silicon dioxide; wherein polymeric material composition exhibits non-hygroscopic characteristics with moisture content less than 15% w/w of the total weight of the composition at room temperature.

According to an embodiment of the present invention, there is provided a polymeric material composition comprising:

(a) at least one superabsorbent polymer, and (b) 0.1% w/w to 2% w/w microporous silicon dioxide; wherein said composition has a moisture content lesser than 15% w/w of the total weight of the composition at room temperature.

According to an embodiment, the superabsorbent polymers of the polymeric material composition is selected from, but not limited to, copolymer of acrylamide and sodium acrylate, copolymer of acrylamide and potassium acrylate; hydrolyzed starch-polyacrylonitrile; 2-propenenitrile homopolymer) or poly(2-propenamide-co-2-propanoic acid, sodium salt); starch-g poly(2-propenamide-co-2-propanoic acid, mixed sodium and aluminium salts); starch g-poly(2-propenamide-co-2-propanoic acid, potassium salt); poly(2-propenamide-co-2-propanoic acid, sodium salt); Starch-g-poly (propenoic acid) sodium salt, Starch-g-poly(propenoic acid) potassium salt, poly-2-propanoic acid, sodium salt; starch-g poly(acrylonitrile) or poly(2-propenamide-co-sodium acrylate); starch/acrylonitrile copolymer; crosslinked copolymers of acrylamide and sodium acrylate; crosslinked polymers of acrylamide and sodium polyacrylate; anionic polyacrylamide; starch grafted sodium polyacrylates; crosslinked copolymers of potassium polyacrylate and polyacrylamide; sodium polyacrylate; superabsorbent polymer laminates and composites; partial sodium salt of crosslinked polypropenoic acid; potassium polyacrylate, lightly crosslinked; sodium polyacrylate, lightly crosslinked; poly(sodiumacrylate) homopolymer; polyacrylamide polymers, carrageenan, agar, alginic acid, guar gums and its derivatives, and gellan gum.

According to a preferred embodiment of the present invention, the superabsorbent polymers are selected from starch-based superabsorbent polymer that includes a monomer graft polymerized onto starch in the presence of an initiator to form a starch graft copolymer.

According to a preferred embodiment of the present invention, the superabsorbent polymers are selected from group comprising of copolymers of hydrolyzed starch-polyacrylonitrile; 2-propenenitrile homopolymer, hydrolyzed, sodium salt or poly(acrylamide co-sodium acrylate) or poly (2-propenamide-co-2-propanoic acid, sodium salt); starch-g-poly(2propenamide-co-2-propanoic acid, mixed sodium and aluminium salts); starch-g-poly(2-propenamide-co-2-propanoic acid, potassium salt); poly(2-propenamide-co-2-propanoic acid, sodium salt); poly-2-propanoic acid, sodium salt; starch-g-poly(acrylonitrile) or poly(2-propenamide-co-sodium acrylate).

In a preferred embodiment, the superabsorbent polymers are selected from the group comprising starch-g-poly (2-propenamide-co-2-propenoic acid) potassium salt, starch-g-poly(2-propenamide-co-2-propenoic acid) sodium salt, starch-g-poly (propenoicacid) sodium salt, starch-g-poly (propenoic acid) potassium salt, sodium polyacrylamide and potassium polyacrylamide.

According to preferred embodiment of the present invention, the superabsorbent polymer is starch-g-poly (2-propenamide-co-2-propenoic acid) potassium salt or crosslinked polyacrylic acid potassium salt.

According to another embodiment of the present invention, particle size of the superabsorbent polymers is in the range from about 2380 μm to about 149 μm (equivalent to 8-100 mesh).

According to another embodiment of the present invention, superabsorbent polymers comprise from about 0.1% w/w to about 99.9% w/w and preferably from about 50% w/w to about 99.5% w/w of the total weight of the composition.

In a preferred embodiment of the present invention superabsorbent polymers comprises from about 80% w/w to about 99% w/w of the total weight of the composition.

According to an embodiment of the present invention superabsorbent polymers have inherent moisture content ranging from 5% w/w to 15% w/w.

According to an embodiment of the present invention superabsorbent polymers have inherent moisture content less than 12% w/w.

According to an embodiment of the present invention superabsorbent polymers have inherent moisture content less than 10% w/w.

According to an embodiment of the present invention superabsorbent polymer has the water absorption capacity from about 300 times to about 1000 times its weight.

According to an embodiment of the present invention superabsorbent polymers have the water absorption capacity from about 500 times to about 800 times its weight.

According to an embodiment of the present invention superabsorbent polymers are in the form of powder and granules.

According to an embodiment of the present invention superabsorbent polymers are in the form of powder.

According to an embodiment of the present invention superabsorbent polymers are in the form of granules.

According to an embodiment of the present invention superabsorbent polymers of the polymeric material composition are biodegradable.

According to an embodiment of the present invention starch grafted superabsorbent polymers of the polymeric material composition are biodegradable.

According to an embodiment of the present invention, the polymeric material composition exhibits anti-caking characteristics in that more than about 90% of the composition particles, by weight, will pass through a U.S. Standard 12 mesh sieve with 1700 micrometer openings after at least 3 hours at about 36±3° C. and about 77±3% relative humidity.

According to an embodiment of the present invention the polymeric material composition comprises of microporous silicon dioxide.

According to an embodiment of the present invention the polymeric material composition comprises of microporous silicon dioxide selected from fumed silica and precipitated silica.

According to an embodiment of the present invention the polymeric material composition comprises the microporous silicon dioxide in an amount less than about 2.5% of the total weight of the composition.

According to an embodiment of the present invention the polymeric material composition comprises the microporous silicon dioxide in an amount less than about 2.0% of the total weight of the composition.

According to an embodiment of the present invention the polymeric material composition comprises the microporous silicon dioxide in an amount less than about 1.5% of the total weight of the composition.

According to an embodiment of the present invention the polymeric material composition comprises from about 0.1% w/w to about 2% w/w microporous silicon dioxide of the total weight of the composition.

According to an embodiment of the present invention the polymeric material composition comprises from about 0.1% w/w to about 1% w/w microporous silicon dioxide of the total weight of the composition.

In an embodiment of the present invention, there is provided a combination comprising:

(a) at least one superabsorbent polymer; and (b) microporous silicon dioxide.

According to an embodiment of the present invention, there is provided a polymeric material composition comprising:

(a) at least one superabsorbent polymer; and (b) 0.1% w/w to 2% w/w microporous silicon dioxide; wherein polymeric material composition exhibits non-hygroscopic characteristics with moisture content less than 15% w/w of the total weight of the composition at room temperature and in humidity ranging from 80-90%.

According to an embodiment of the present invention, there is provided a polymeric material composition comprising:

(a) at least one superabsorbent polymer; and (b) 0.1% w/w to 2% w/w microporous silicon dioxide; wherein said composition has a moisture content lesser than 15% w/w of the total weight of the composition at room temperature and in humidity ranging from 80-90%.

According to an embodiment of the present invention, the polymeric material composition exhibits non-hygroscopic characteristics with moisture content less than 15% w/w of the total weight of the composition at room temperature and in humidity ranging from 80-90%.

According to an embodiment of the present invention, the polymeric material composition exhibits non-hygroscopic characteristics with moisture content less than 12% w/w of the total weight of the composition at room temperature and in humidity ranging from 80-90%.

According to an embodiment of the present invention, the polymeric material composition exhibits non-hygroscopic characteristics with moisture content less than 10% w/w of the total weight of the composition at room temperature and in humidity ranging from 80-90%.

According to an embodiment of the present invention, the polymeric material composition has a moisture content less than 15% w/w of the total weight of the composition at room temperature and in humidity ranging from 80-90%.

According to an embodiment of the present invention, the polymeric material composition has a moisture content less than 12% w/w of the total weight of the composition at room temperature and in humidity ranging from 80-90%.

According to an embodiment of the present invention, the polymeric material composition has a moisture content less than 10% w/w of the total weight of the composition at room temperature and in humidity ranging from 80-90%.

According to an embodiment of the present invention the polymeric material composition comprises of at least one starch grafted superabsorbent polymer and 0.1% w/w to 2% w/w microporous silicon dioxide wherein said polymeric material composition has a moisture content less than 15% w/w of the total weight of the composition at room temperature and in humidity ranging from 80-90%.

According to an embodiment of the present invention, the polymeric material composition comprises of starch-g-poly (2-propenamide-co-2-propenoic acid) potassium salt and 0.1% w/w to 2% w/w precipitated silica wherein said polymeric material composition has a moisture content less than 15% w/w of the total weight of the composition at room temperature and in humidity ranging from 80-90%.

According to an embodiment of the present invention the polymeric material composition comprises starch-g-poly (2-propenamide-co-2-propenoic acid) potassium salt and 0.1% w/w to 2% w/w fumed silica wherein said polymeric material composition exhibits non-hygroscopic characteristics with moisture content less than 15% w/w of the total weight of the composition at room temperature and in humidity ranging from 80-90%.

According to an embodiment of the present invention, a process of preparing a polymeric material composition comprising a superabsorbent polymer and 0.1% w/w to 2% w/w microporous silicon dioxide; wherein said polymeric material composition exhibits non-hygroscopic characteristics with moisture content less than 15% w/w of the total weight of the composition at room temperature and in humidity ranging from 80-90%; and wherein said process comprises steps of:

1. contacting the superabsorbent polymer and microporous silicon dioxide in a mixing vessel; and 2. blending the contents of step (1) to obtain the polymeric material composition.

According to an embodiment of the present invention the process of preparing polymeric material composition comprising at least one superabsorbent polymer and 0.1% w/w to 2% w/w microporous silicon dioxide; wherein said polymeric material composition has a moisture content less than 15% w/w of the total weight of the composition at room temperature and in humidity ranging from 80-90%; and wherein said process comprises the steps of:

1. contacting superabsorbent polymers and microporous silicon dioxide in a mixing vessel;

2. blending the contents of step (1) to obtain polymeric material composition.

According to an embodiment of the present invention the process of preparing a polymeric material composition comprising a starch grafted superabsorbent polymer and 0.1% w/w to 2% w/w microporous silicon dioxide; wherein said polymeric material composition exhibits non-hygroscopic characteristics with moisture content less than 15% w/w of the total weight of the composition at room temperature and in humidity ranging from 80-90%; and wherein process comprises the steps of:

1. contacting the starch grafted superabsorbent polymer and microporous silicon dioxide in a mixing vessel; and
2. blending the contents of step (1) to obtain polymeric material composition.

According to an embodiment of the present invention the process of preparing a polymeric material composition comprising at least one starch grafted superabsorbent polymer and 0.1% w/w to 2% w/w microporous silicon dioxide; wherein polymeric material composition has a moisture content less than 15% w/w of the total weight of the composition at room temperature and in humidity ranging from 80-90%; and wherein the process comprises the steps of:

1. contacting at least one starch grafted superabsorbent polymer and microporous silicon dioxide in a mixing vessel; and
2. blending the contents of step (1) to obtain the polymeric material composition.

According to an embodiment of the present invention, blending of superabsorbent polymer and microporous silicon dioxide is carried out in suitable mixing equipment such as ribbon blender, plough mixer, and horizontal non-gravity mixer.

According to an embodiment of the present invention, blending of superabsorbent polymer and microporous silicon dioxide is carried out from about 5 min to about 30 min to obtain a homogeneous polymeric material composition.

According to an embodiment of the present invention, provided is a method of treating plants and plant propagation material by applying to their locus, a polymeric material composition comprising: at least one superabsorbent polymer and 0.1% w/w to 2% w/w microporous silicon dioxide wherein polymeric material composition exhibits non-hygroscopic characteristics with moisture content less than 15% w/w of the total weight of the composition at room temperature and in humidity ranging from 80-90%.

According to an embodiment of the present invention, the method of treating plants and plant propagation material comprises applying to their locus, a polymeric material composition comprising: at least one superabsorbent polymer; and 0.1% w/w to 2% w/w microporous silicon dioxide wherein said polymeric material composition exhibits non-hygroscopic characteristics with moisture content lesser than 15% w/w of the total weight of said composition at room temperature and in humidity ranging from 80-90%.

According to an embodiment of the present invention, the method of treating plants and plant propagation material comprises applying to their locus, a polymeric material composition comprising: at least one starch grafted superabsorbent polymer and 0.1% w/w to 2% w/w microporous silicon dioxide wherein polymeric material composition exhibits non-hygroscopic characteristics with moisture content less than 15% w/w of the total weight of the composition at room temperature and in humidity ranging from 80-90%.

According to an embodiment of the present invention, the method of treating plants and plant propagation material comprises applying to their locus, a polymeric material composition comprising: at least one starch grafted superabsorbent polymer and 0.1% w/w to 2% w/w microporous silicon dioxide wherein polymeric material composition has a moisture content less than 15% w/w of the total weight of the composition at room temperature and in humidity ranging from 80-90%.

According to an embodiment of the present invention, the method of treating plants and plant propagation material comprises applying to their locus, a polymeric material composition comprising starch-g-poly (2-propenamide-co-2-propenoic acid) potassium salt and 0.1% w/w to 2% w/w precipitated silica wherein polymeric material composition exhibits non-hygroscopic characteristics with moisture content less than 15% w/w of the total weight of the composition at room temperature and in humidity ranging from 80-90%.

According to an embodiment of the present invention, the method of treating plants and plant propagation material comprises applying to their locus, a polymeric material composition comprising starch-g-poly (2-propenamide-co-2-propenoic acid) potassium salt and 0.1% w/w to 2% w/w fumed silica wherein polymeric material composition exhibits non-hygroscopic characteristics with moisture content less than 15% w/w of the total weight of the composition at room temperature and in humidity ranging from 80-90%.

According to an embodiment of the present invention, polymeric material composition is used for fluid retention.

According to an embodiment of the present invention, polymeric material composition is used in agriculture for soil application for water retention.

According to an embodiment of the present invention, polymeric material composition is used in agriculture for soil application along with other agriculturally relevant substances such as agrochemicals and fertilizers.

According to an embodiment of the present invention, the polymeric material composition comprises from about 90% w/w to about 99.9% w/w superabsorbent polymer(s) and from about 0.1% w/w to about 2% w/w microporous silicon dioxide; wherein polymeric material composition exhibits non-hygroscopic characteristics with moisture content less than 15% w/w w/w of the total weight of the composition at room temperature and in humidity ranging from 80-90%.

According to an embodiment of the present invention the polymeric material composition comprises superabsorbent polymer(s) and 0.1% w/w to 2% w/w microporous silicon dioxide; wherein said composition has a moisture content lesser than 15% w/w of the total weight of the composition at room temperature in humidity ranging from 80-90%.

According to an embodiment of the present invention the polymeric material composition comprises starch-g-poly (2-propenamide-co-2-propenoic acid) potassium salt and 0.1% w/w to 2% w/w precipitated silica; and wherein said composition has a moisture content lesser than 15% at room temperature in humidity ranging from 80-90%.

According to an embodiment of the present invention the polymeric material composition comprises starch-g-poly (2-propenamide-co-2-propenoic acid) potassium salt and 0.1% w/w to 2% w/w fumed silica; and wherein said composition has a moisture content lesser than 15% at room temperature in humidity ranging from 80-90%.

According to an embodiment of the present invention, the polymeric material composition comprises from about 98% w/w to about 99.9% w/w superabsorbent polymers and from about 0.1% w/w to about 1% w/w microporous silicon dioxide; wherein polymeric material composition exhibits non-hygroscopic characteristics with moisture content less than 15% w/w of the total weight of the composition at room temperature and in humidity ranging from 80-90%.

According to an embodiment of the present invention, the polymeric material composition comprises from about 98% w/w to about 99.9% w/w superabsorbent polymer of 8 mesh to 60 mesh and from about 0.1% w/w to about 1% w/w precipitated silica; wherein polymeric material composition exhibits non-hygroscopic characteristics with moisture content less than 15% w/w of the total weight of the composition at room temperature and in humidity ranging from 80-90%; and wherein said polymeric material composition is in the form of coarse granules.

According to an embodiment of the present invention, the polymeric material composition comprises from about 98% w/w to about 99.9% w/w superabsorbent polymer of 100 mesh and from about 0.1% w/w to about 1% w/w precipitated silica; wherein polymeric material composition exhibits non-hygroscopic characteristics with moisture content less than 15% w/w of the total weight of the composition at room temperature and in humidity ranging from 80-90%; and wherein said polymeric material composition is in the form of fine powder.

According to an embodiment of the present invention, the polymeric material composition comprises from about 98% w/w to about 99.9% w/w superabsorbent polymer of 8 mesh to 60 mesh and from about 0.1% w/w to about 1% w/w fumed silica; wherein polymeric material composition exhibits non-hygroscopic characteristics with moisture content less than 15% w/w of the total weight of the composition at room temperature and in humidity ranging from 80-90%; and wherein said polymeric material composition is in the form of coarse granules.

According to an embodiment of the present invention, the polymeric material composition comprises from about 98% w/w to about 99.9% w/w superabsorbent polymer of 100 mesh and from about 0.1% w/w to about 1% w/w fumed silica; wherein polymeric material composition exhibits non-hygroscopic characteristics with moisture content less than 15% w/w of the total weight of the composition at room temperature and in humidity ranging from 80-90%; and wherein said polymeric material composition is in the form of fine powder.

In an embodiment of the present invention, the polymeric material composition may further comprise one or more agrochemicals, antifreeze agent, wetting agents, fillers, surfactants, anticaking agents, pH-regulating agents, preservatives, biocides, antifoaming agents, colorants and other formulation aids.

According to an embodiment of the present invention, the polymeric material composition is used in agricultural and horticultural applications.

According to an embodiment of the present invention, the polymeric material composition application to soil in agricultural settings have resulted in earlier seed germination and/or blooming, decreased irrigation requirements, increased propagation, increased crop growth and production, increased crop quality, decreased soil crusting, increased yield and decreased time of emergence.

According to an embodiment of the present invention, the polymeric material composition application is used as carrier for applying active ingredients with the purpose of controlling pests and weeds.

According to an embodiment of the present invention, the polymeric material composition application is used as carrier for micronutrients or fertilizers with the purpose of providing nutrition to the plants.

It will be understood that the specification and examples are illustrative but not limitative of the present invention and that other embodiments within the spirit and scope of the invention will suggest themselves to those skilled in the art. Other embodiments can be practiced that are also within the scope of the present invention. The following examples illustrate the invention, but by no means intend to limit the scope of the invention.

Example 1: 99.9% w/w Polyacrylamide Coarse Granules

| Ingredients | Quantity (% w/w) |
| --- | --- |
| Polyacrylamide polymer (8 to 60 mesh) | 99.9 |
| Precipitated silica | 0.1 |
| Total | 100 |

99.9 g polyacrylamide polymer (8 to 60 mesh) was mixed with 0.1 g silica in a ribbon blender and blended for about 30 minutes. The blended mixture thus obtained was send to quality check to analyse moisture content and packed.

Example 2: 99.9% w/w Polyacrylamide Coarse Granules

| Ingredients | Quantity (% w/w) |
| --- | --- |
| Polyacrylamide polymer (8 to 60 mesh) | 99.9 |
| Fumed silica | 0.1 |
| Total | 100 |

Starch-g-poly (2-propenamide-co-2-propenoic acid) potassium salt (8 to 60 mesh) and silica were mixed in above mentioned quantity and processed as per the process given in Example-1.

Example 3: 99.5% w/w Starch-g-Poly (2-propenamide-co-2-propenoic acid) Potassium Salt Coarse Granules

| Ingredients | Quantity (% w/w) |
| --- | --- |
| Starch-g-poly (2-propenamide-co-2-propenoic acid) potassium salt (8 to 60 mesh) | 99.5 |
| Precipitated silica | 0.5 |
| Total | 100 |

Starch-g-poly (2-propenamide-co-2-propenoic acid) potassium salt (8 to 60 mesh) and silica were mixed in above mentioned quantity and processed as per the process given in Example-1.

Example 4: 99.4% w/w Starch-g-Poly
(2-propenamide-co-2-propenoic acid) Potassium
Salt Coarse Granules

| Ingredients | Quantity (% w/w) |
|---|---|
| Starch-g-poly (2-propenamide-co-2-propenoic acid) potassium salt (8 to 60 mesh) | 99.4 |
| Precipitated silica | 0.6 |
| Total | 100 |

Starch-g-poly (2-propenamide-co-2-propenoic acid) potassium salt (8 to 60 mesh) and silica were mixed in above mentioned quantity and processed as per the process given in Example-1.

Example 5: 99% w/w Starch-g-Poly
(2-propenamide-co-2-propenoic acid) Potassium
Salt Coarse Granules

| Ingredients | Quantity (% w/w) |
|---|---|
| Starch-g-poly (2-propenamide-co-2-propenoic acid) potassium salt (8 to 60 mesh) | 99 |
| Precipitated silica | 1 |
| Total | 100 |

Starch-g-poly (2-propenamide-co-2-propenoic acid) potassium salt (100 mesh) and silica were mixed in above mentioned quantity and processed as per the process given in Example-1.

Example 6: 98.5% w/w Starch-g-Poly
(2-propenamide-co-2-propenoic acid) Potassium
Salt Powder

| Ingredients | Quantity (% w/w) |
|---|---|
| Starch-g-poly (2-propenamide-co-2-propenoic acid) potassium salt (8 to 60 mesh) | 98.5 |
| Precipitated silica | 1.5 |
| Total | 100 |

Starch-g-poly (2-propenamide-co-2-propenoic acid) potassium salt (8 to 60 mesh) and silica were mixed in above mentioned quantity and processed as per the process given in Example-1.

Example 7: 99.4% w/w Starch-g-Poly
(2-propenamide-co-2-propenoic acid) Potassium
Salt Powder

| Ingredients | Quantity (% w/w) |
|---|---|
| Starch-g-poly (2-propenamide-co-2-propenoic acid) potassium salt (100 mesh) | 99.4 |
| Precipitated silica | 0.6 |
| Total | 100 |

Starch-g-poly (2-propenamide-co-2-propenoic acid) potassium salt (100 mesh) and silica were mixed in above mentioned quantity and processed as per the process given in Example-1.

Example 8: 99% w/w Starch-g-Poly
(2-propenamide-co-2-propenoic acid) Potassium
Salt Powder

| Ingredients | Quantity (% w/w) |
|---|---|
| Starch-g-poly (2-propenamide-co-2-propenoic acid) potassium salt (100 mesh) | 99 |
| Fumed silica | 1 |
| Total | 100 |

Starch-g-poly (2-propenamide-co-2-propenoic acid) potassium salt (100 mesh) and silica were mixed in above mentioned quantity and processed as per the process given in Example-1.

Example 9: 98.5% w/w Starch-g-Poly
(2-propenamide-co-2-propenoic acid) Potassium
Salt Powder

| Ingredients | Quantity (% w/w) |
|---|---|
| Starch-g-poly (2-propenamide-co-2-propenoic acid) potassium salt (100 mesh) | 98.5 |
| Precipitated silica | 1.5 |
| Total | 100 |

Starch-g-poly (2-propenamide-co-2-propenoic acid) potassium salt (100 mesh) and silica were mixed in above mentioned quantity and processed as per the process given in Example-1.

Example 10: 98.5% w/w Starch-g-Poly (2-propenamide-co-2-propenoic acid) Potassium Salt Powder

| Ingredients | Quantity (% w/w) |
|---|---|
| Starch-g-poly (2-propenamide-co-2-propenoic acid) potassium salt (8 to 60 mesh) | 98.0 |
| Precipitated silica | 2.0 |
| Total | 100 |

Starch-g-poly (2-propenamide-co-2-propenoic acid) potassium salt (8-60 mesh) and silica were mixed in above mentioned quantity and processed as per the process given in Example-1.

Example 11: 97.5% w/w Starch-g-Poly (2-propenamide-co-2-propenoic acid) Potassium Salt Powder (Comparative Example)

| Ingredients | Quantity (% w/w) |
|---|---|
| Starch-g-poly (2-propenamide-co-2-propenoic acid) potassium salt (100 mesh) | 97.5 |
| Precipitated silica | 2.5 |
| Total | 100 |

Starch-g-poly (2-propenamide-co-2-propenoic acid) potassium salt (100 mesh) and silica were mixed in above mentioned quantity and processed as per the process given in Example-1.

Example 12: 97.5% w/w Starch-g-Poly (2-propenamide-co-2-propenoic acid) Potassium Salt Powder (Comparative Example)

| Ingredients | Quantity (% w/w) |
|---|---|
| Starch-g-poly (2-propenamide-co-2-propenoic acid) potassium salt (8 to 60 mesh) | 97.5 |
| Precipitated silica | 2.5 |
| Total | 100 |

Starch-g-poly (2-propenamide-co-2-propenoic acid) potassium salt (8 to 60 mesh) and silica were mixed in above mentioned quantity and processed as per the process given in Example-1.

Example 13: 100% w/w Starch-g-Poly (2-propenamide-co-2-propenoic acid) Potassium Salt Powder (Comparative Example)

| Ingredients | Quantity (% w/w) |
|---|---|
| Starch-g-poly (2-propenamide-co-2-propenoic acid) potassium salt (8 to 60 mesh) | 100 |
| Total | 100 |

Comparative Study of Polymeric Material Composition with Normal Starch-Based Superabsorbent Polymers The polymeric material composition prepared according to the present invention was analysed for moisture content and water absorption capacity. It was observed that the compositions of Example-2, 3, 5 and 6 prepared according to the present invention did not suffer decline in absorption capacity. Also, moisture content of the compositions of Example-2, 3, 5 and 6 remain controlled within 15%. The optimum concentration of silica from 0.5% to 1.5% found best to control moisture under 10%. However, the composition of Example-13 deprived of silica became lumpy when kept for 48 hours at room temperature and in humidity ranging from 80-90% and hence was not found suitable for further study. (Table 1 and Table 1A).

TABLE 1

| | Example-13 | | Example-2 | | Example-3 | |
|---|---|---|---|---|---|---|
| | 0 day | Sample Kept at 90% Humidity and 25° C. for 48 hrs. | 0 day | Sample Kept at 90% Humidity and 25° C. for 48 hrs. | 0 day | Sample Kept at 90% Humidity and 25° C. for 48 hrs. |
| Physical form/ Appearance | Flowable granules | Become Lumpy | Flowable granules | Flowable granules | Flowable granules | Flowable granules |
| Water absorption in gm/gm of polymer/ composition | 405 | 385 | 409 | 397 | 407 | 412 |
| Moisture content (% w/w) | 5.92 | 16.33 | 5.68 | 13.97 | 5.52 | 9.87 |

TABLE 1A

| | Example-5 | | Example-6 | |
|---|---|---|---|---|
| | 0 day | Sample Kept at 90% Humidity and 25° C. for 48 hrs. | 0 day | Sample Kept at 90% Humidity and 25° C. for 48 hrs. |
| Physical form/ Appear- ance | Flowable granules | Flowable granules | Flowable granules | Flowable granules |
| Water absorption in gm/gm of polymer/composition | 408 | 406 | 405 | 410 |
| Moisture content (% w/w) | 5.25 | 8.94 | 5.11 | 7.56 |

Study of Optimization of Microporous Silicon Dioxide

Study was conducted to identify most suitable range of microporous silicon dioxide in the polymeric material composition. Several compositions were prepared by incorporating various amounts of microporous silicon dioxide ranging from 0.1% to 2.5%.

Figure 2:
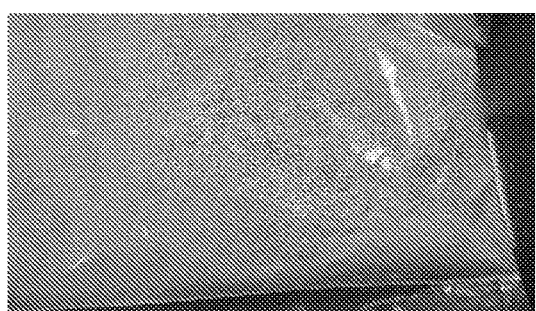
FIG. 2 is a photograph of a composition comprising 2.5% microporous silica and starch based superabsorbent polymer of 8 to 60 mesh size.

It was observed that the compositions of Example-4 with 0.6% microporous silica and starch based superabsorbent polymer of 8 to 60 mesh size (FIG. 1) remained intact without dusting or separation of microporous silicon dioxide from superabsorbent polymer material. Upon increasing the concentration of microporous silicon dioxide from 0.6% to 2.5% (Example-12 and FIG. 2), clear cut separation of superabsorbent polymer and microporous silicon dioxide was observed.

Figure 3:
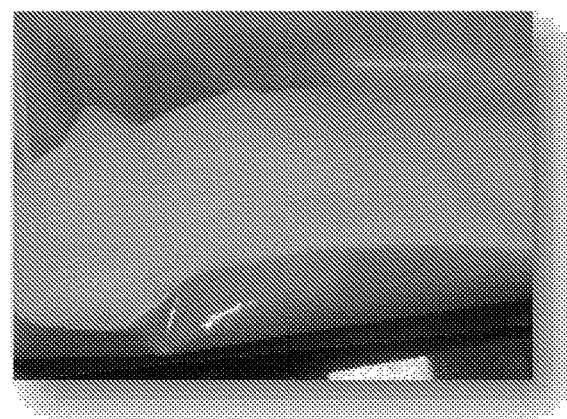
FIG. 3 is a photograph of a composition comprising 0.6% microporous silica and starch based superabsorbent polymer of 100 mesh size.
Figure 4:
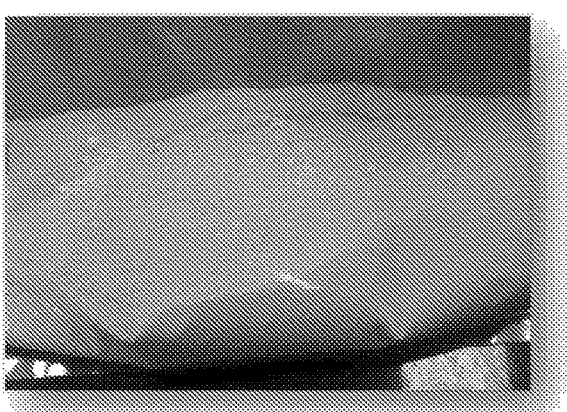
FIG. 4 is a photograph of a composition comprising 2.5% microporous silica and starch based superabsorbent polymer of 100 mesh size.

Similarly, it was observed that the compositions of Example-7 with 0.6% microporous silica and starch based superabsorbent polymer of 100 mesh size (FIG. 3) remained intact without dusting or separation of microporous silicon dioxide from superabsorbent polymer material. Upon increasing the concentration of microporous silicon dioxide from 0.6% to 2.5% (Example-11 and FIG. 4), clear cut separation of superabsorbent polymer and microporous silicon dioxide was observed.

Real Time Stability Study

The polymeric material composition prepared according to the present invention was analysed for moisture content and water absorption capacity in real time after keeping the composition intact in trilaminated aluminium pouch for 18 months. It was observed that the compositions of Example-2, 3, 5 and 6 prepared according to the present invention did not suffer decline in absorption capacity even after storing it for 18 months under real time study in trilaminated pouch at ambient conditions. Also, moisture content of the compositions of Example-2, 3, 5 and 6 remain controlled within 15% w/w of the total weight of the polymeric material composition. The optimum concentration of silica from 0.5% w/w to 1.5% w/w was found best to control moisture under 10% w/w of the total weight of the composition. (Table 2).

TABLE 2

| | 18-months shelf-life storage in trilaminated pouch at ambient conditions | | | | |
|---|---|---|---|---|---|
| | Example-2 | Example-3 | Example-5 | Example-6 | Example-10 |
| Physical form/ Appear- ance | Flowable granules | Flowable granules | Flowable granules | Flowable granules | Flowable granules |
| Water absorption in gm/gm of SAP | 402 | 408 | 404 | 389 | 380 |
| Moisture content (% w/w) | 5.30 | 6.48 | 5.78 | 6.24 | 6.90 |

It is clear from the experimental data, as described above, the polymeric material composition of the present invention found to have controlled moisture with free-flowing characteristics. Microporous silicon dioxide within 0.1% w/w to 2% w/w found to control inherent moisture content of starch-based polymers and reduce caking of the polymeric material composition. The polymeric material composition of the present invention found to be very useful in agriculture applications for fluid or water retention. The composition remained quite stable during transport and shelf life. The process described is simple, convenient to perform and does not require any heavy instruments. As such, the spirit and scope of the disclosure should not be limited to the description of the preferred embodiment contained therein.

We claim:

1. A polymeric material composition comprising:
(a) at least one superabsorbent polymer; and
(b) 0.1% w/w to 2.5% w/w microporous silicon dioxide;
   wherein the composition has a moisture content of less than 15% w/w of the total weight of the composition at room temperature, wherein the at least one superabsorbent polymer has a particle size ranging from about 2,380 μm to about 149 μm, wherein the at least one superabsorbent polymer comprises starch-g-poly (2-propenamide-co-2-propenoic acid) potassium salt, and the composition has a moisture content lesser than 15% w/w of the total weight of said composition at room temperature in humidity ranging from 80-90%.

2. The polymeric material composition as claimed in claim 1 wherein the at least one superabsorbent polymer is in the form of granules or powder.

3. The polymeric material composition as claimed in claim 1 wherein the at least one superabsorbent polymer has a water absorption capacity from about 300 times to about 1000 times its weight.

4. The polymeric material composition as claimed in claim 1 wherein the at least one microporous silicon dioxide is selected from amorphous silica and precipitated silica.

5. The polymeric material composition as claimed in claim 1 wherein the polymeric material composition exhibits non-hygroscopic characteristics.

6. The polymeric material composition as claimed in claim 1 wherein the composition comprises 0.1% w/w to 2% w/w microporous silicon dioxide.

7. A process of preparing a polymeric material composition comprising a superabsorbent polymer, wherein the superabsorbent polymer comprises starch-g-poly (2-prope-namide-co-2-propenoic acid) potassium salt; and 0.1% w/w to 2% w/w microporous silicon dioxide; wherein the polymeric material composition exhibits non-hygroscopic characteristics with moisture content less than 15% w/w of the total weight of the composition at room temperature and in humidity ranging from 80-90%, and wherein the superabsorbent polymer has a particle size ranging from about 2,380 μm to about 149 μm; and wherein process comprises the steps of:

1. contacting the superabsorbent polymer and microporous silicon dioxide in a mixing vessel; and 2. blending the contents of step (1) to obtain the polymeric material composition.

8. A method of treating soil, plants and plant propagation material by applying to their locus, a polymeric material composition comprising: at least one superabsorbent polymer, wherein the at least one superabsorbent polymer comprises starch-g-poly (2-propenamide-co-2-propenoic acid) potassium salt; and 0.1% w/w to 2% w/w microporous silicon dioxide, wherein the polymeric material composition exhibits non-hygroscopic characteristics with moisture content lesser than 15% w/w of the total weight of the composition at room temperature and in humidity ranging from 80-90%, and wherein the superabsorbent polymer has a particle size ranging from about 2,380μm to about 149 μm.

9. A process of using the polymeric material composition as claimed in claim 1 for water retention, the process comprising applying the polymeric material composition to a locus of a plant or plant propagation material.

\* \* \* \* \*